United States Patent
Park

(10) Patent No.: US 9,088,935 B2
(45) Date of Patent: Jul. 21, 2015

(54) DATA COMMUNICATION DEVICE IN A PORTABLE TERMINAL AND METHOD THEREOF

(71) Applicant: Samsung Electronics Co., Ltd., Gyeonggi-do (KR)

(72) Inventor: Sungho Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 120 days.

(21) Appl. No.: 13/660,446

(22) Filed: Oct. 25, 2012

(65) Prior Publication Data

US 2013/0137424 A1 May 30, 2013

(51) Int. Cl.
*H04M 1/00* (2006.01)
*H04W 48/18* (2009.01)
*H04W 88/06* (2009.01)

(52) U.S. Cl.
CPC .............. *H04W 48/18* (2013.01); *H04W 88/06* (2013.01)

(58) Field of Classification Search
CPC ..... H04W 88/06; H04W 36/14; H04W 48/18; H04W 84/12; H04W 28/04; H04W 40/02; H04W 74/00; H04W 88/02; H04W 48/20; H04W 92/02; H04W 12/06; H04W 16/14; H04W 36/0083; H04W 36/30; H04W 48/08; H04W 48/16; H04W 72/02; H04W 72/06; H04W 72/1215; H04L 12/5692; H04L 12/2697; H04L 43/50; H04L 12/2801; H04L 1/205; H04L 1/24; H04L 25/0216; H04L 25/03343; H04M 1/72519; H04M 15/58

USPC .......... 455/456.1, 552.1, 426.1, 553.1, 435.2, 455/411, 444, 452.1, 418, 41.2, 509; 370/332, 338, 329, 401, 252, 310; 709/203; 379/32.01
See application file for complete search history.

(56) References Cited

U.S. PATENT DOCUMENTS

| | | | |
|---|---|---|---|
| 5,594,781 A * | 1/1997 | Kozdon et al. .................. 379/60 |
| 2004/0029612 A1* | 2/2004 | Gorsuch .................... 455/552.1 |
| 2005/0192022 A1* | 9/2005 | Minnick et al. ............... 455/453 |
| 2007/0053327 A1* | 3/2007 | Park .............................. 370/335 |
| 2008/0070566 A1* | 3/2008 | Athalye ........................ 455/425 |
| 2010/0080174 A1* | 4/2010 | Zhu et al. ...................... 370/328 |
| 2010/0189087 A1* | 7/2010 | Hara et al. .................... 370/338 |
| 2012/0020300 A1* | 1/2012 | Sheriff et al. ................. 370/328 |
| 2012/0144435 A1* | 6/2012 | Spilo et al. ...................... 725/78 |

FOREIGN PATENT DOCUMENTS

KR     10-1015568 B1     2/2011

* cited by examiner

*Primary Examiner* — Fred Casca
(74) *Attorney, Agent, or Firm* — Cha & Reiter, LLC.

(57) ABSTRACT

A data communication device implemented in a portable terminal which the terminal includes at least two communication units for establishing a connection to an Internet communication network, wherein, the connections of the communication units to the respective network are made to determine the respective communication speeds; comparing and analyzing the respective measured communication speeds of the communication units; and selecting a communication unit having a higher or the highest communication speed to access the Internet to provide data communication.

12 Claims, 3 Drawing Sheets

DATA COMMUNICATION DEVICE IN A PORTABLE TERMINAL AND METHOD THEREOF

CLAIM OF PRIORITY

This application claims the benefit under 35 U.S.C. §119 (a) of a Korean patent application filed on Nov. 16, 2011 in the Korean Intellectual Property Office and assigned Ser. No. 10-2011-0119262, the entire disclosure of which is hereby incorporated by reference.

BACKGROUND OF THE INVENTION

1. Field of the Invention

The present invention relates to a portable communication device and a method thereof, and more particularly, to an apparatus for selecting one of two communication units having excellent communication environment during a web service mode.

2. Description of the Related Art

Recent portable terminal includes a plurality of communication units and provides data and voice communications and an Internet service. A communication unit for a communication service may operate Global System for Mobile communication (GSM), Code-Division Multiple Access (CDMA), Wideband Code-Division Multiple Access (WCDMA), and Long Term Evolution (LTE) communication protocols. A communication unit for Internet service may be a Wireless Fidelity (Wi-Fi), wireless broadband (Wibro), or Worldwide Interoperability for Microwave Access (Wimax) communication unit. Here, the GSM, CDMA, and WCDMA communication units may be 3G communication unit, and the LTE communication unit may be 4G communication unit.

When a portable terminal having a plurality of communication units as described above may be connected to Internet by various wireless media, access methods are used in an order of an expensive medium. Here, when the user selects such a medium to be connected, an operation of turning-on/off a certain communication unit needs to be manually performed to connect with Internet.

For example, when a portable terminal supporting two media of Wi-Fi and 3G/4G networks is connected to the Internet, the portable terminal firstly determines presence of connection of the Wi-Fi communication unit. In this case, when the portable terminal is connected to an AP, the terminal attempts to connect with the Internet. However, when the Wi-Fi communication unit is connected to an AP but the AP is not connected to the Internet, although it may be automatically connected through a 3G/4G communication unit, a connection error message is output to a user. As a result, the user manually needs to turn-off the Wi-Fi communication unit, and to reattempt access. Further, when the portable terminal may be connected to the Internet through a Wi-Fi communication unit, although speed of connection using the Wi-Fi communication unit due to a multi-user access is lower than that using the 3G/4GA communication unit, the portable terminal may connect to the Internet by the Wi-Fi communication unit according to a cost preference medium connection policy. In this case, although a portable terminal may execute the Internet service at high speed, it may execute the Internet service through a communication unit serving the Internet service a communication unit serving at relatively low speed. In this case, when the user uses a 3G/4G communication unit instead of a Wi-Fi communication unit having low speed, only when manually turning-off the Wi-Fi communication unit, the web connection is possible by a 3G/4G communication unit.

SUMMARY OF THE INVENTION

The present invention has been made in view of the above problems, and provides a device for checking speed of each network before connecting a portable terminal having various wireless media such as 3G/4G and Wi-Fi to a data network (Internet), thus allowing a user to use the Internet having the highest speed using a medium having the highest speed among accessible networks according to the checked outcome, and a method thereof.

Instead of manually selecting a desired medium among a plurality of wireless communicable media by a user of a portable terminal, the present invention can recognize the speed with a data network (Internet) before a state of each medium, and use the Internet at a desired time point using the highest speed medium.

In accordance with an aspect of the present invention, a data communication device of a portable terminal includes: a first communication unit in communication wirelessly with an Internet communication network; a second communication unit in communication wirelessly with a base station; an input unit generating an Internet access request signal; and a controller accessing a data communication network through the first and second communication units to measure respective communication speeds when the Internet access is requested, comparing and analyzing the measured communication speeds to select a communication unit having higher communication speed, and accessing the Internet through the selected communication unit to serve data communication.

In accordance with another aspect of the present invention, a data communication method of a portable terminal including at least two communication units in communication wirelessly with an Internet communication network includes: sequentially selecting communication units when Internet access is requested to access a data communication network and to measure respective communication speeds; comparing and analyzing the measured communication speeds of the communication units; and selecting a communication unit having the highest communication speed in the comparing and analyzing the measured communication speeds and accessing an Internet to serve data communication.

BRIEF DESCRIPTION OF THE DRAWINGS

The above features and advantages of the present invention will be more apparent from the following detailed description in conjunction with the accompanying drawings, in which.

DETAILED DESCRIPTION OF EXEMPLARY EMBODIMENTS

Hereinafter, exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

A portable terminal according to the embodiment of the present invention includes a plurality of communication units. In operation, when the user performs data communication using a data network (Internet), the portable terminal selects a communication network having the highest speed among accessible communication networks to receive a data communication service. A portable terminal according to the embodiment of the present invention allows a user to manually select a desired medium among a plurality of wireless communicable media, measures speed with a data network (Internet), and automatically selects a communication unit having the highest speed to perform a data communication function.

Hereinafter, a data communication network and an Internet may be used as the same meaning. As used herein, the term "base station communication unit" refers to a communication unit connected to a 3G network or a 4G network through a base station to perform speech and data communication functions of the portable terminal. The communication unit may include GSM, WCDMA, CDMA, and LTE communication units. Further, the Internet communication unit is connected to a data communication network (Internet communication network) unit for performing speech and data communication of the portable terminal and may include Wi-Fi, Wibro, and Wimax communication units.

Figure 1:
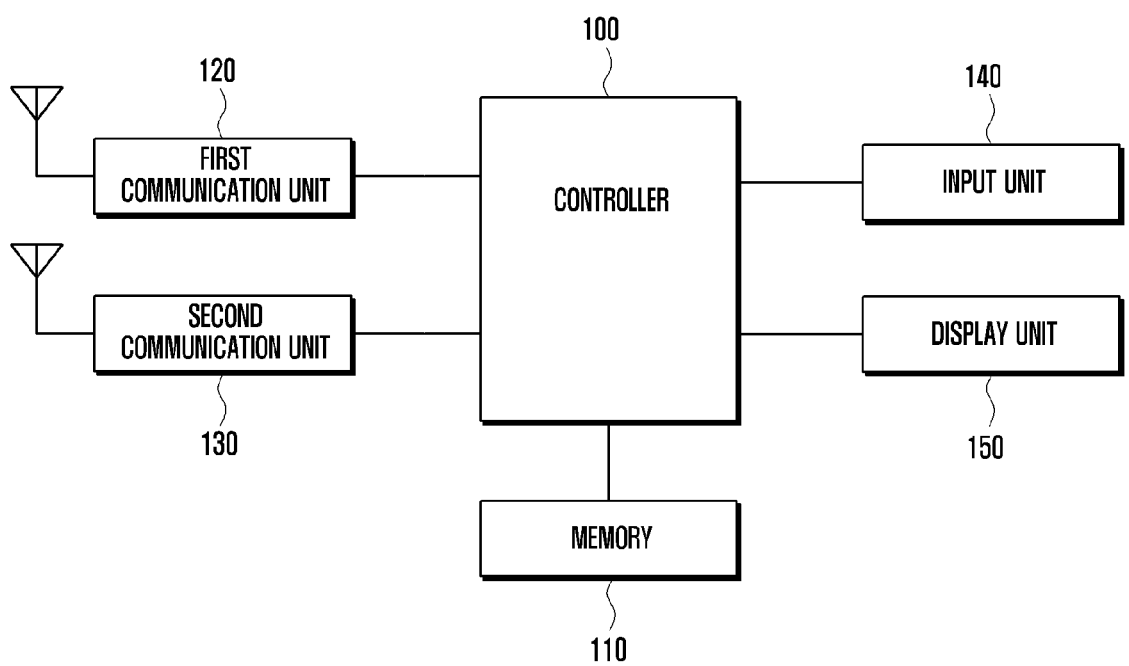
FIG. 1 is a block diagram illustrating a configuration of a portable terminal according to an exemplary embodiment of the present invention.

FIG. 1 is a block diagram illustrating a configuration of a portable terminal according to an exemplary embodiment of the present invention.

Referring to FIG. 1, a first communication unit 120 and a second communication unit 130 performs a function of connecting to corresponding communication network in a wireless scheme. Here, the communication network may be a base station communication network or an Internet communication network. Each of the first and second communication units 120 and 130 includes a transmitter composed of a frequency up-converter up-converting a transmission signal into an RF band and a power amplifier, and a receiver composed of an amplifier low-noise amplifying an RF received signal and a frequency down-converter down-converting the RF signal into a base band. Each of the first and second communication units 120 and 130 may further include a modulator for modulating the transmission signal and transferring the modulated transmission signal to the transmitter and a demodulator for demodulating a signal output from the receiver. Here, the modulator and the demodulator may include 3G, GSM modulator and demodulator such as CDMA or WCDMA, or a 4G modulator and demodulator such as an LTE scheme, respectively. The modulator and the demodulator may include Wi-Fi, Wibro, or Wimax modulator and demodulator, respectively.

The controller 100 controls an overall operation of the portable terminal. During data communication, the controller 100 checks speed with a corresponding communication network through the first communication unit 120 and the second communication unit 130, selects a communication unit accessing a communication network having the highest speed for data communication according to the embodiment of the present invention.

A memory 110 may include a program memory storing an operation program of the portable terminal and programs according to the embodiment of the present invention, and a data memory storing install data and data generated during the execution of a program.

An input unit 140 performs a function of inputting a command for controlling an operation of the portable terminal. The display unit 150 performs a function of displaying display data under control of the controller 100. Here, the input unit 140 and the display unit 150 may be an integral touch screen. The first communication unit 120 and/or the second communication unit 130 may be connected to the base station in a wireless scheme to perform speech and data communication function. The first communication unit 120 and/or the second communication unit 130 may be connected to an Internet to perform data communication. In this case, a communication unit connected to the base station may include a modulator and demodulator of 3G or 4G scheme to perform speech and data communication service through the base station. The communication unit connected to the Internet may connect with an Internet service to perform a data communication service function.

Hereinafter, the first communication unit 120 is connected to the Internet in a wireless scheme using a modem according to a Wi-Fi, Wibro, or Wimax scheme. The second communication unit 130 may include a modem to connect to a base station to perform speech and data communications according to a GSM, CDMA, WCDMA, or LTE scheme. For illustrative purposes, in FIG. 1, two communication units in communication with a plurality of base stations (namely, base stations using GSM, WCDA, and LTE communication schemes) are provided. However, it should be noted that the teachings of the present invention may be applicable to a network having at least three communication units. Thus, the number of communication units shown in FIG. 1 should not limit the scope of the present invention.

When a user requests Internet access through the input unit 140, the controller 100 accesses an Internet server through the first communication unit 120 to measure communication speed, and accesses an Internet server through the second communication unit 130 to measure communication speed. Next, the first communication unit 120 and the second communication unit 130 compare respective two service communication speeds to select a communication unit capable of serving data communication at higher communication speed, and connect with the Internet through the selected communication unit to provide the data communication. When the user requests Internet access, the portable terminal having communication units connecting with a plurality data communication network may automatically select a communication unit capable of serving data communication at the highest communication speed.

Figure 2:
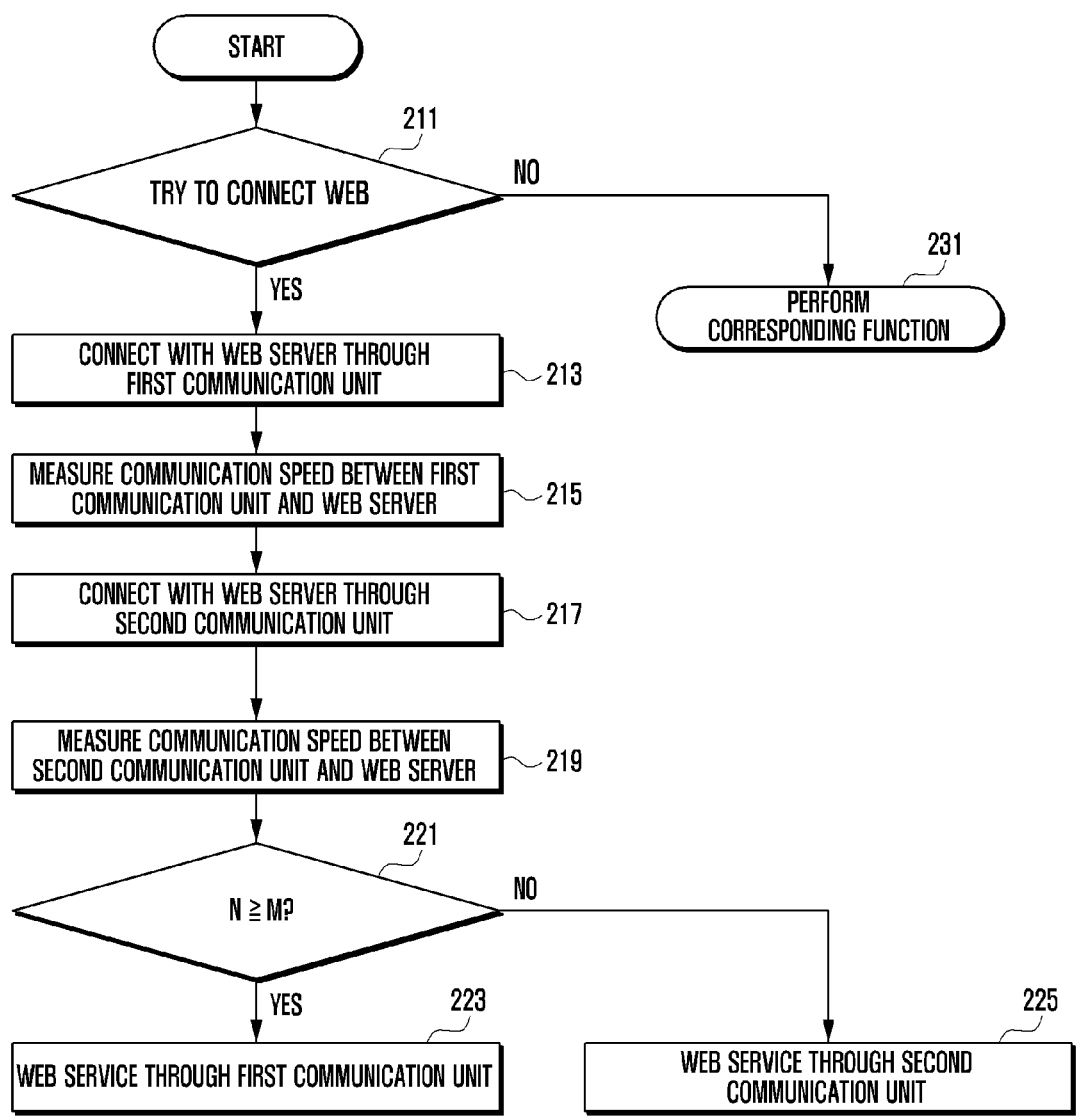
FIG. 2 is a flowchart illustrating a method for serving data communication in a portable terminal according to an exemplary embodiment of the present invention.

FIG. 2 is a flowchart illustrating a method for serving data communication in a portable terminal according to an exemplary embodiment of the present invention.

Referring to FIG. 2, when receiving a user's request to connect to the web, a controller 100 tries connection to a web server through a first communication unit 120 (213). When connecting with the web service, the controller 100 measures communication speed between the first communication unit 120 and a web server (215). Then, the controller 100 tries connection with a web server through a second communication unit 130 (217). When connecting with the web server, the controller 100 measures communication speed between the second communication unit 130 and the web server (219).

Assuming that communication speed between the first communication unit and the web server is N and communication speed between the second communication unit 130 and the web server is M, the controller 100 compares the communication speed N between the first communication unit and the web server with the communication speed M between the second communication unit 130 and the web server measured at step 211. If the communication speed N between the first communication unit and the web server is equal to or greater than the communication speed M between the second communication unit 130 (N≥M), the controller 100 connects with an Internet server through the first communication unit 120 to serve data communication (223). Conversely, if the communication speed N between the first communication unit and the web server is less than the communication speed M between the second communication unit 130 (N<M), the controller 100 connects with the Internet server through the second communication unit 130 to serve the data communication (225).

Accordingly, during a data communication service through Internet in a portable terminal including a plurality of communication units, the user does not need to manually select a desired communication medium as the invention provides scheme to automatically select and use the most efficient communication unit.

In an alternate embodiment, a communication unit may be selected by analyzing a billing system together with the communication speed. That is, different billing systems may be used according to communication networks during a data communication service. In a case of a communication network adopting a more expensive billing system, if data communication speed is high, data communication may be perform at more expensive cost. As such, the user has an option to desire different combination of communication scheme which can be preprogrammed or manually set during operation. For example, the user may be provide with an option to select a higher or lower cost associated with a particular communication medium, so that if the communication unit selected according to the operation steps of FIG. 2, the user can further select one of the communication units providing desired cost or what the user is willing to pay at that particular time. Accordingly, as described above, a method for selecting a communication network may be used by analyzing a billing system as well as the communication speed to provide an economical means to communicate.

Figure 3:
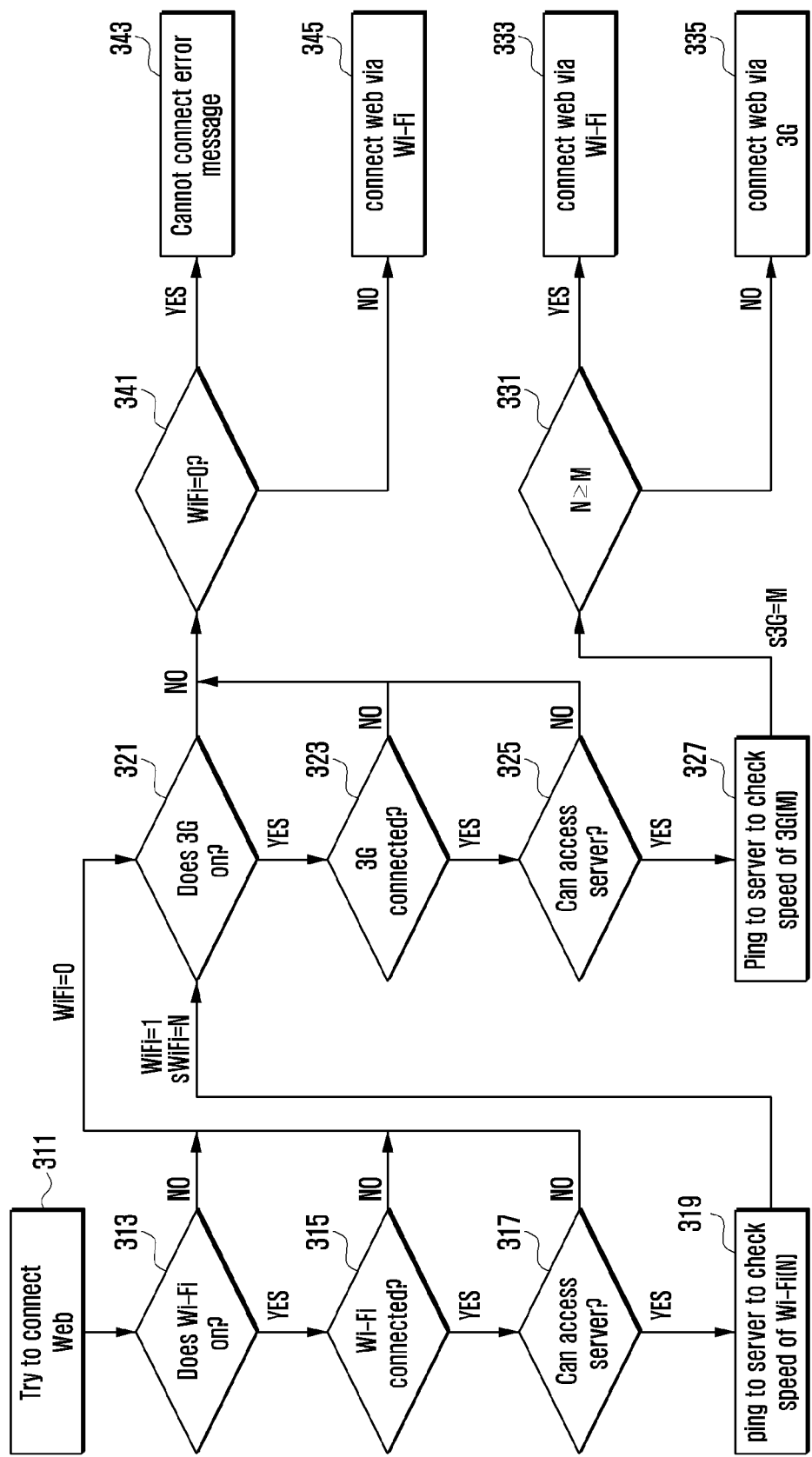
FIG. 3 is a flowchart illustrating a method for serving data communication in a portable terminal including a 3G communication unit and a Wi-Fi communication unit according to an exemplary embodiment of the present invention.

FIG. 3 is a flowchart illustrating a method for serving data communication in a portable terminal including a 3G communication unit and a Wi-Fi communication unit according to an exemplary embodiment of the present invention. Here, for illustrative purposes, the first communication unit may be Wi-Fi communication unit, and the second communication unit 130 may be a 3G communication unit (e.g., WCDMA communication unit).

Referring to FIG. 3, when a user tries to connect a web, the controller 100 senses the request to connect a web (311). Next, the controller 100 connects to the web through first and second communication units 120 and 130 to measure the respective communication speed. Hereinafter, it is assumed that the controller 100 accesses a web through a Wi-Fi communication unit and then accesses the web through a 3G communication unit.

When performing steps 313 to 317, the controller 100 determines whether a Wi-Fi communication unit 120 is turned-on, a Wi-Fi is connected, and a communication unit may be connected to a web server through an Internet. In this case, if at least one of the three conditions is not satisfied, the controller 100 senses the fact and tests a state of a 3G communication unit 130 (321). However, if three conditions of steps 313 to 317 are satisfied, the controller 100 connects with an Internet server through a Wi-Fi communication unit 120 to measure communication speed of a Wi-Fi (319). In this case, the speed measurement may use ping (ping to server to check speed of Wi-Fi).

The ping is a fundamental Internet program which has a certain Internet address and check whether the address can receive a request. That is, the ping is a program which sends predetermined amount of data to a certain server, and tags the round time of data to check a network situation of a certain time period. Accordingly, when the ping is used, the portable terminal may transmit data to the Internet server, checks restoring time of response data from the Internet server to measure data communication speed of a corresponding communication network.

In this case, when measuring Wi-Fi communication speed at step 319, the controller 100 may perform the ping test during the preset number. When completing the speed measurement, the controller 100 may average the measured communication speed to calculate certain Wi-Fi speed N. In this case, the controller 100 sets a Wi-Fi flag indicating that it may access an Internet server through a Wi-Fi communication unit 120 (Wi-Fi=1), and stores the measured Wi-Fi communication speed N (sWi-Fi=N) through the Wi-Fi communication unit 120.

When performing steps 321 to 325, the controller 100 determines whether a 3G communication unit 130 is turned-on, 3G communication is possible, and a communication unit may be connected to a web server through a 3G communication network. In this case, if at least one of the three conditions is not satisfied, the controller 100 senses the fact and goes to step 341. However, if three conditions of steps 321 to 325 are satisfied, the controller 100 connects with an Internet server through a 3G communication unit 130 to measure communication speed through a 3G communication network. In this case, the speed measurement may use ping (ping to server to check speed of 3G).

When measuring 3G communication speed (327), the controller 100 may perform the ping test during the set number of times. When completing the speed measurement, the controller 100 may average the measured communication speed to calculate certain speed M of 3G. In this case, the controller 100 sets a 3G flag indicating that it may access an Internet server through a 3G communication unit 130 (3G=1), and stores the measured 3G communication speed N (s3G=N) through the 3G communication unit 130.

Next, the controller 100 compares the Wi-Fi communication speed N with the 3G communication speed M (331). In this case, when the Wi-Fi communication speed N is greater than the 3G communication speed M, the controller 100 connects with a web server through a Wi-Fi communication unit 120 to serve data communication (333). When the 3G communication speed M is greater than the Wi-Fi communication speed N, the controller 100 connects with a web server through the 3G communication unit 130 to perform the data communication (335). That is, the controller 100 compares the Wi-Fi communication speed N with the 3G communication speed M and connects with a communication network having higher communication speed to serve the data communication.

If the three conditions at steps 321 to 325 are not satisfied, the controller 100 tests whether it may access the Internet server through a Wi-Fi communication unit 120 (Wi-Fi=1). When the Wi-Fi access is possible, the controller 100 connects with the web server through the Wi-Fi communication unit 120 to serve the data communication (345). When the Wi-Fi access is not possible, the controller 100 displays an error message and terminates an Internet access procedure (343). Although not shown in FIG. 2, if the three conditions of steps 321 to 325 are satisfied but the Wi-Fi access is not possible (that is when the three conduction of steps 313 to 317), the controller 100 may connect with the web server through the 3G communication unit 130 to perform the data communication.

As described above, when the web service is requested, the communication unit may be turned-off. For example, a communication unit (e.g., Wi-Fi, Wibro, Wimax, etc.) connecting with the Internet server needs to be set in an on state by a user of the portable terminal. However, when power of the portable terminal is turned-on, the 3G communication unit may be a state capable of communicating with a base station. That is, when the power of the portable terminal is in an on state, the communication unit (e.g., GSM, CDMA, WCDMA, LTE, etc.) communicating with the base station is always in the on state.

Here, when a user request a web service in a case where the base station communication unit is in the on state and the Internet communication unit is in an off state, the controller 100 may connect with a data communication network through the base station communication unit to simultaneously measure communication speed and turn-on the internet communication unit. This is performed to reduce a measuring time by measuring the communication speed through another communication unit during on time of the internet communication unit.

In this case, when a web service is requested from a user, the controller 100 checks whether there is a communication unit in an off state. When there is the communication unit, the controller 100 drives a communication unit in an on state to simultaneously measure communication speed between a data communication network and the portable terminal and to turn-on a communication unit in the off state. Next, if measurement of the communication speed of the communication unit in the on state is completed, the controller 100 may drive another communication unit switched to an on state to continuously measure the communication speed between the data communication network and the portable terminal. The measured communication speeds are compared and analyzed to select a communication unit having higher communication speed and to serve the data communication through the selected communication unit.

Instead of manually selecting a desired medium among a plurality of wireless communicable media by a user of a portable terminal, the present invention can recognize speed with a data network (Internet) before a state of each medium, and use Internet at a desired time point using the highest speed medium. Accordingly, the user may automatically select and use the most efficient medium at a desired time point for connecting with the Internet in the portable terminal.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An electronic device, comprising:
   a first interface for accessing network resources over a first communications network;
   a second interface for accessing the network resources over a second communications network; and
   a processor configured to:
   responsive to a request to access the network resources, select one of the first interface and the second interface to test first based on a respective power state of each of the first interface and the second interface;
   test a service characteristic of the selected one of the first interface and the second interface and power on the other one of the first interface and the second interface, wherein the service characteristic of the selected one of the first interface and the second interface is tested concurrently with the other one of the first interface and the second interface powering on;
   test a service characteristic of the other one of the first interface and the second interface; and
   access the network resources with one of the first interface and the second interface based on the respective service characteristics of the first interface and the second interface,
   wherein the service characteristic of each of the first interface and the second interface is tested by performing a ping test a preset number of times and averaging the ping test results, and
   wherein the network resources are accessed based on respective billing rates associated with the first communications network and the second communications network.

2. The electronic device of claim 1, wherein the service characteristic of the other one of the first interface and the second interface is tested after testing the service characteristic of the selected one of the first interface and the second interface is completed.

3. The electronic device of claim 1, wherein the service characteristic of the other one of the first interface and the second interface is tested after testing of the service characteristic of the selected one of the first interface and the second interface is started.

4. The electronic device of claim 1, wherein the first interface is a Wi-Fi interface, and the second interface is a 3G or 4G interface.

5. A method for accessing data by a portable terminal including a first interface for accessing network resources over a first communications network and a second interface for accessing the network resources over a second communications network, comprising:
   responsive to a request to access the network resources, selecting one of the first interface and the second interface to test first based on a respective power state of each of the first interface and the second interface;

testing, by a processor, a service characteristic of the selected one of the first interface and the second interface and powering on the other one of the first interface and the second interface, wherein the service characteristic of the selected one of the first interface and the second interface is tested concurrently with the other one of the first interface and the second interface powering on;

testing a service characteristic of the other one of the first interface and the second interface; and accessing the network resources with one of the first interface and the second interface based on the respective service characteristics of the first interface and the second interface, wherein the service characteristic of each of the first interface and the second interface is tested by performing a ping test a preset number of times and averaging the ping test results, and wherein the network resources are accessed based on respective billing rates associated with the first communications network and the second communications network.

6. The method of claim 5, wherein the service characteristic of the other one of the first interface and the second interface is tested after testing of the service characteristic of the selected one of the first interface and the second interface is started.

7. The method of claim 5, wherein the first interface is a Wi-Fi interface, and the second interface is a 3G or 4G interface.

8. The method of claim 5, wherein the service characteristic of the other one of the first interface and the second interface is tested after testing the service characteristic of the selected one of the first interface and the second interface is completed.

9. A portable terminal, comprising:
a first interface for accessing network resources over a first communications network;
a second interface for accessing the network resources over a second communications network;
a processor configured to:
responsive to a request to access the network resources, select one of the first interface and the second interface to test first based on a respective power state of each of the first interface and the second interface;
test a service characteristic of the selected one of the first interface and the second interface and power on the other one of the first interface and the second interface, wherein the service characteristic of the selected one of the first interface and the second interface is tested concurrently with the other one of the first interface and the second interface powering on;
test a service characteristic of the other one of the first interface and the second interface; and
access the network resources with one of the first interface and the second interface based on the respective service characteristics of the first interface and the second interface,
wherein the service characteristic of each of the first interface and the second interface is tested by performing a ping test a preset number of times and averaging the ping test results, and
wherein the network resources are accessed based on respective billing rates associated with the first communications network and the second communications network.

10. The portable terminal of claim 9, wherein the service characteristic of the other one of the first interface and the second interface is tested after testing of the service characteristic of the selected one of the first interface and the second interface is started.

11. The portable terminal of claim 9, wherein the first interface is a Wi-Fi interface, and the second interface is a 3G or 4G interface.

12. The portable terminal of claim 9, wherein the service characteristic of the other one of the first interface and the second interface is tested after testing the service characteristic of the selected one of the first interface and the second interface is completed.

* * * * *

UNITED STATES PATENT AND TRADEMARK OFFICE
CERTIFICATE OF CORRECTION

| | | |
|---|---|---|
| PATENT NO. | : 9,088,935 B2 | Page 1 of 1 |
| APPLICATION NO. | : 13/660446 | |
| DATED | : July 21, 2015 | |
| INVENTOR(S) | : Sungho Park | |

It is certified that error appears in the above-identified patent and that said Letters Patent is hereby corrected as shown below:

On the Title Page

Insert --...(30) Foreign Application Priority Data
November 16, 2011 (KR) 10-2011-0119262...--

In the Claims

Column 9, Claim 9, Line 40 should read as follows:
--...a second communications network; and...--

Signed and Sealed this
Eighth Day of December, 2015

Michelle K. Lee
*Director of the United States Patent and Trademark Office*